Sept. 8, 1925.
J. BELLOCCHIO
ICE CREAM PACKAGE
Filed July 21, 1924
1,552,671
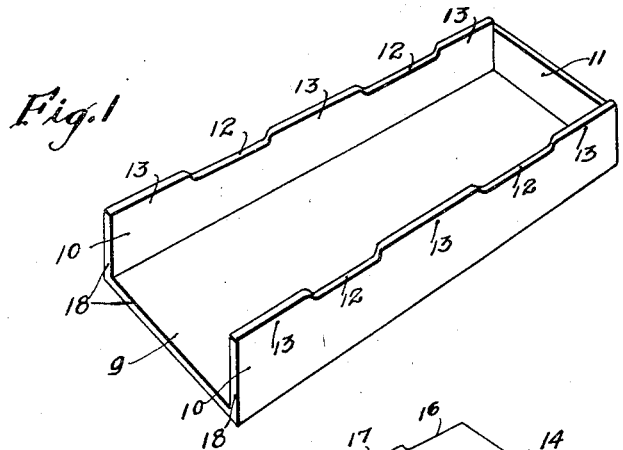
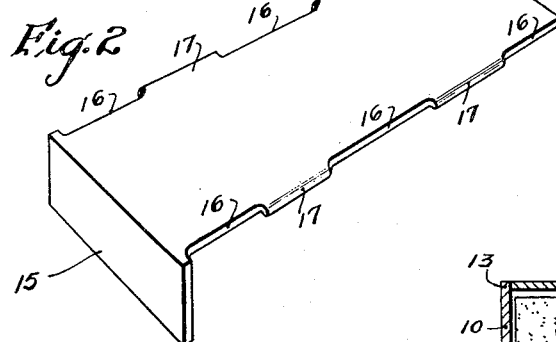
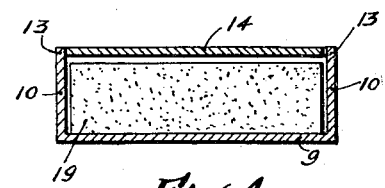
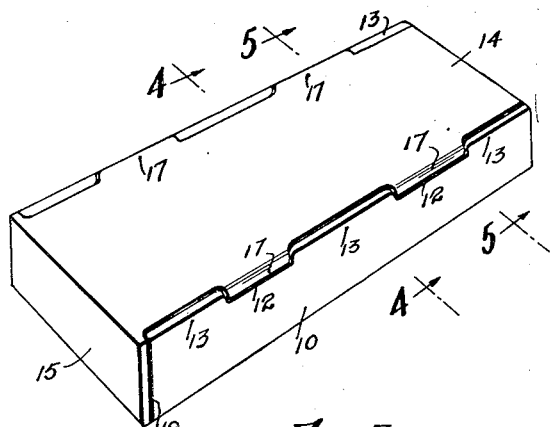
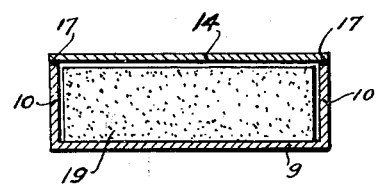
INVENTOR
J. Bellocchio
BY Geo. H Beeler
ATTORNEY Patented Sept. 8, 1925.

1,552,671

UNITED STATES PATENT OFFICE.

JOHN BELLOCCHIO, OF NEW YORK, N. Y.

ICE-CREAM PACKAGE.

Application filed July 21, 1924. Serial No. 727,190.

*To all whom it may concern:*

Be it known that I, JOHN BELLOCCHIO, a citizen of the United States, residing at New York, borough of Manhattan, in the county of New York and State of New York, have invented certain new and useful Improvements in Ice-Cream Packages, of which the following is a specification.

This invention relates to containers for foodstuffs and more particularly to edible containers intended for the reception of ice cream and the like.

Among the objects of the invention is to provide an edible container that will wholly inclose the contents thereof so that not only will the chances of spilling the contents be minimized, but, as in the case where the content is ice cream, the container by wholly inclosing the same, will serve to insulate it more effectively than has heretofore been accomplished and thus serve a valuable purpose if it should be desired after removing the ice cream from the refrigerator to hold the same for a period of time before consumption, while at the same time securing the ice cream more effectively from contamination by dust and the like, a dry container being less apt to collect dust than the moist surface of an ice cream block.

Another object of this invention is to provide a container having a removable cover provided with means to engage the container.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a perspective view of the box structure.

Fig. 2 is a perspective view of the cover.

Fig. 3 is a perspective view of the assembled container.

Figs. 4 and 5 are sectional views on the respective lines of Fig. 3.

Referring now more specifically to the drawings, the box structure which may be of any suitable form but is preferably rectangular as shown comprises a bottom 9, sides 10 and an end wall 11 the edge whereof is preferably upon the same level as the edges 12 of the sides, while the end opposite 11 is preferably open. A plurality of spaced lugs 13, or three upon each side uniformly located as shown, project upward or outward from the sides, constituting an integral portion of the side walls and lying preferably in the planes thereof for the sake of simplicity in construction. These lugs are of any suitable length, and of a height approximately equal to the thickness of the box and particularly to that of the cover as will be indicated hereinafter. It is apparent that the specific construction of the box can be altered so that, for instance, with the box open at a side and closed at the top thereof, the lugs can be located along the side edges of the top and bottom.

The cover comprises a top portion 14 and an end portion 15 preferably at right angles thereto. The width of the portion 14 as at the edges 16 is substantially equal to the internal width of the box so that it can readily be inserted between the lugs 13 thereof. Lugs 17 project outward from the top portion so as to engage the container at 12 between the lugs 13. The spacing and length of these lugs 17 is therefore determined by that of the lugs 13, whereby a snug interlocking effect is secured, the successive lugs forming in effect a mortise and tenon joint. The portion 15 is of a height and width equal to that of the box so as to abut against the open end of the box at the edges 18 thereof to effectively close the same when the top 14 is engaged by means of the lugs, while the free end of the top abuts against the end 11.

To receive plastic material such as ice cream 19 and the like, said material is first preferably molded into block form in a mould which can be readily constructed for the purpose, the block being made of suitable size to facilitate the more rapid insertion thereof. If on the other hand the filler is to consist of candy or other substantially solid material, the container can be filled without the necessity of previously forming the same into a block.

The purpose of forming the box with an open end is to facilitate the rapid and easy insertion of such plastic materials as ice cream and the like, and for the same reason the cover must be made of angular construction. The object of the lugs is to prevent the cover from slipping along the box, said cover being retained in engagement therewith by the pressure of the hand of the consumer. Whether one begins to eat at the one end or at the other, as long as a portion of the cover is intact, the lugs will prevent the same from slipping, a result which is worth while, considering that in many cases the consumer is a child.

I claim:

In a container for foodstuffs, the combination of a box construction having an open end and top and a plurality of spaced upstanding lugs along the upper edges of the sides thereof, and a cover wholly removable from said box comprising an end portion and a top portion to close the open end and top of said box, said top portion having a plurality of spaced lugs along the side edges thereof to engage with the lugs aforesaid so as to secure said cover from sliding along said box and said end portion in closing position for the open end of the box.

In testimony whereof I affix my signature.

JOHN BELLOCCHIO